United States Patent [19]

Lee

[11] Patent Number: 6,064,459
[45] Date of Patent: May 16, 2000

[54] LIQUID CRYSTAL DISPLAY WITH SEPARATELY DRIVEN COMMON ELECTRODE REGIONS AND METHODS OF OPERATING THEREOF

[75] Inventor: Dae-won Lee, Kyungki-do, Rep. of Korea

[73] Assignee: Samsung Electronics Co., Ltd., Rep. of Korea

[21] Appl. No.: 08/818,786

[22] Filed: Mar. 11, 1997

[30] Foreign Application Priority Data

Mar. 15, 1996 [KR] Rep. of Korea ......................... 96-7013

[51] Int. Cl.[7] .................................................. G02F 1/1333
[52] U.S. Cl. ................................................................. 349/139
[58] Field of Search ....................................... 349/139, 149, 349/151, 152, 42

[56] References Cited

U.S. PATENT DOCUMENTS 5,519,521  5/1996  Okimoto et al. .......................... 359/59

*Primary Examiner*—Robert H. Kim
*Assistant Examiner*—Tu T Nguyen
*Attorney, Agent, or Firm*—Myers Bigel Sibley & Sajovec

[57] ABSTRACT

A liquid crystal display (LCD) includes a first substrate and a plurality of common electrode regions on the first substrate. A plurality of common electrode drivers are responsive to a common electrode signal to separately drive each of the plurality of common electrode regions to thereby produce a common electrode potential on each of the common electrode regions. A second substrate may be attached to the first substrate in an opposed relationship thereto. A plurality of bonding substrates may be attached to the second substrate adjacent an edge of the first substrate, a respective one of the bonding substrates including a common electrode conductor electrically connected to a common electrode region of the plurality of common electrode regions. A respective one of the bonding substrates may have a common electrode driver mounted thereon, electrically connected to the common electrode conductor thereof. A respective one of the bonding substrates may include a first common electrode conductor and a second common electrode conductor electrically connected to adjacent first and second common electrode regions, respectively, and a respective one of the bonding substrates may have a first common electrode driver and a second common electrode driver mounted thereon, the first and second common electrode drivers being electrically connected to the first and second common electrode conductors, respectively. The plurality of common electrode regions may include a first row of common electrode regions and a second row of common electrode regions, and the plurality of bonding substrates may include a first plurality of bonding substrates mounted adjacent the first row of common electrode regions and a second plurality of bonding substrates mounted adjacent the second row of common electrode region.

13 Claims, 3 Drawing Sheets

LIQUID CRYSTAL DISPLAY WITH SEPARATELY DRIVEN COMMON ELECTRODE REGIONS AND METHODS OF OPERATING THEREOF

FIELD OF THE INVENTION

The present invention relates to displays and methods of operation thereof, more particularly, to liquid crystal displays (LCDs) and methods of operation thereof.

BACKGROUND OF THE INVENTION

In displaying an image on an LCD, distortion of the image may occur which is dependent on the pattern of the image, e.g., the intensity of particular regions of the image with respect to other regions of the image. This image-dependent distortion may be caused by a phenomenon known as "cross-talk."

A typical LCD 5 is depicted in FIG. 1. The LCD 5 may include first and second substrates 10, 20, which are connected to a printed circuit board 30 which is mounted adjacent a side edge and upper and lowers edges of the first and second substrate 10. A plurality of data line driver integrated circuit packages 40, 42 typically connect the printed circuit board 30 to upper and lower edges of the second substrate 20, and drive a plurality of data lines formed on the second substrate 20. A plurality of gate driver IC packages 60 typically connect the printed circuit board to the side edge of the second substrate 20, and drive a plurality of gate lines formed on the second substrate 20.

Typically, a common electrode layer 9 is typically formed on the first substrate 10, substantially covering the surface of the first substrate 10 as illustrated in FIG. 2, which serves as a common electrode for the liquid crystal elements of the display 5. A data line driver IC package 40 includes a tape automated bonding (TAB) tape 50 which includes a plurality of conductors which are connected to a plurality of data lines on the second substrate 20. A data driver IC 52 is mounted on the bonding tape 50 and is electrically connected to the plurality of conductors in the bonding tape 50, thereby connecting the data line driver IC 52 to a group of data lines on the second substrate 20. These data lines may be connected directly to electrodes of liquid crystal elements (passive LCD) or indirectly connected to electrodes of liquid crystal elements through control elements such as thin-film transistors (TFTs), as is well-known to those skilled in the art. The bonding tape 50 also may include common electrode conductors 51 which are connected to the common electrode layer 9. These common electrode conductors 51 are typically connected to the output of an common electrode driver 54, typically a voltage follower operational amplifier circuit, through a trace of the printed circuit board 30. The common electrode driver 54 circuit drives the common electrode layer 9 with a common electrode voltage through the common electrode conductors 51.

Referring again to FIG. 1, when the display 5 attempts to display a black region 70 surrounded by white, for example, cross-talk can cause the white regions to have differing intensities. The white regions 82 above and below the black region 70 may appear darker than the white regions 80 on either side of the black region 70. This distortion may be attributed to a distortion of the common electrode voltage on the common electrode layer 9 with respect to the other control signals applied to the LCD 5, e.g., the data signals applied to individual LCD elements.

FIG. 3 illustrates an ideal common electrode voltage 3 with respect to a gate drive signal 1 and a video voltage 2 which corresponds to a "black" level for a "normally white" liquid crystal element. As shown, the common electrode voltage 3 ideally has an inverted phase with respect to the video voltage 2, thus producing a maximum voltage A across the liquid crystal element. However, as illustrated in FIG. 4, the actual common electrode voltage 4 may be delayed with respect to the video voltage 2, thus producing a reduced voltage B across the liquid crystal element. This delay may be caused by the impedance characteristics of the common electrode layer 9. As illustrated in FIG. 5, when "white" is displayed, the video voltage 2 is ideally in phase with the common electrode voltage, thus producing a minimum voltage D across the liquid crystal element. As with black display of FIG. 4, the actual common electrode voltage 4 may be distorted due to impedance characteristics of the common electrode.

However, the common electrode voltage can be further distorted for "white" elements adjacent elements which are displaying "black." Cross-talk may occur because increased discharge currents from the "black elements" may locally reduce the common electrode voltage magnitude and thus the voltage difference between the common electrode and the video voltage of the adjacent "white" elements. This reduced voltage may cause "white" elements adjacent "black" elements to appear brighter than "white" elements in other portions of the display. This effect can be exacerbated in white regions horizontally adjacent a black region for a common electrode structure such as that illustrated in FIGS. 1 and 2.

SUMMARY OF THE INVENTION

In light of the foregoing, it is an object of the present invention to provide liquid crystal displays (LCDs) and methods of operation thereof which can provide less image distortion due to cross talk between elements of the display.

This and other objects, features and advantages are provided according to the present invention by LCDs and methods of operating thereof in which the common electrode is divided into a plurality of common electrode regions, each of which is separately driven to achieve a common electrode potential on each of the common electrode regions. Preferably, a plurality of common electrode drivers are provided, a respective one of which drives a respective one of the common electrode regions. According to a preferred embodiment, the common electrode regions are formed on a substrate in first and second rows, and a pair of common electrode drivers are mounted along with a data line driver on one of a plurality of bonding substrates, e.g., a tape automated bonding (TAB) tapes, positioned adjacent first and second edges of the substrate. A respective one of the pair of common electrode drivers drives a respective one of a pair of adjacent common electrode regions. In this manner, a less distorted common electrode potential can be achieved across the display.

In particular, according to the present invention, a liquid crystal display (LCD) includes a first substrate and a plurality of common electrode regions on the first substrate. Preferably, means are provided for separately driving each of the plurality of common electrode regions to thereby produce a common electrode potential on each of the common electrode regions. The means for separately driving may include a plurality of common electrode drivers, for example, voltage follower circuits, a respective one of the plurality of drivers being electrically connected to a respective one of the common electrode regions, each of the plurality of common electrode drivers being responsive to a common electrode signal to produce a common electrode potential on each of the common electrode regions.

A second substrate may be attached to the first substrate in an opposed relationship thereto. A plurality of bonding substrates may be attached to the second substrate adjacent an edge of the first substrate, a respective one of the bonding substrates including a common electrode conductor electrically connected to a common electrode region of the plurality of common electrode regions. A respective one of the bonding substrates may have a common electrode driver mounted thereon, electrically connected to the common electrode conductor thereof. According to an embodiment of the invention, a respective one of the bonding substrates includes a first common electrode conductor and a second common electrode conductor electrically connected to adjacent first and second common electrode regions, respectively, and a respective one of the bonding substrates has a first common electrode driver and a second common electrode driver mounted thereon, the first and second common electrode drivers being electrically connected to the first and second common electrode conductors, respectively. The LCD may further include a plurality of data lines formed on the second substrate, and a respective one of the bonding substrates may further include a group of data line conductors electrically connected to a group of data lines of the plurality of data lines. The LCD may further include a plurality of data line drivers, a respective one of the plurality of data line drivers being mounted on a respective one of the plurality of bonding substrates and electrically connected to the group of data line conductors thereof. The plurality of common electrode regions may include a first row of common electrode regions and a second row of common electrode regions, and the plurality of bonding substrates may include a first plurality of bonding substrates mounted adjacent the first row of common electrode regions and a second plurality of bonding substrates mounted adjacent the second row of common electrode region.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF PREFERRED EMBODIMENTS

Figure 1:
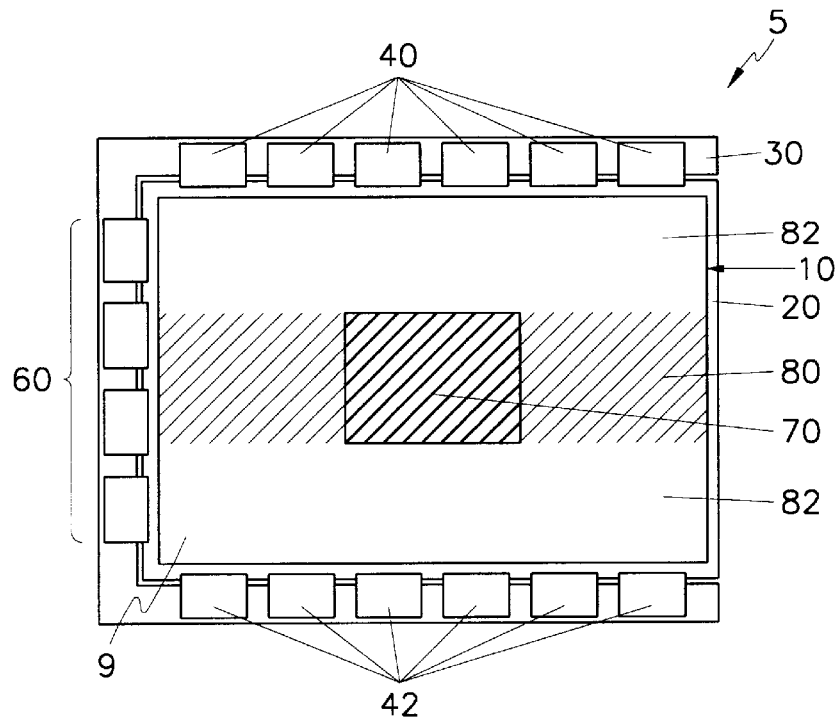
FIG. 1 is a top view illustrating a liquid crystal display (LCD) according to the prior art.
Figure 2:
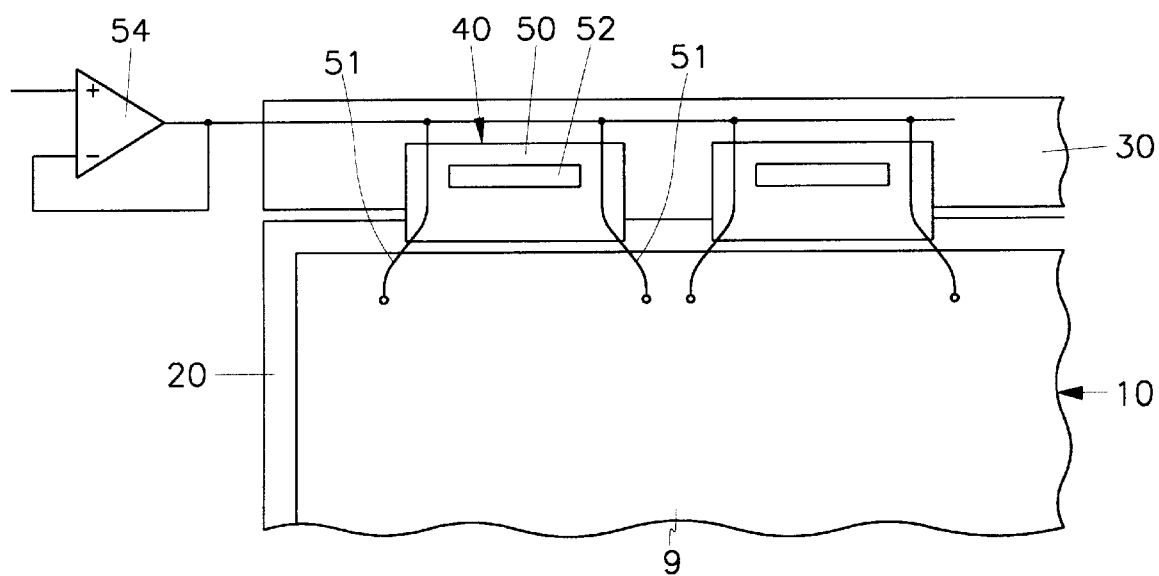
FIG. 2 is a detailed view illustrating a portion of the LCD of FIG. 1.
Figure 3:
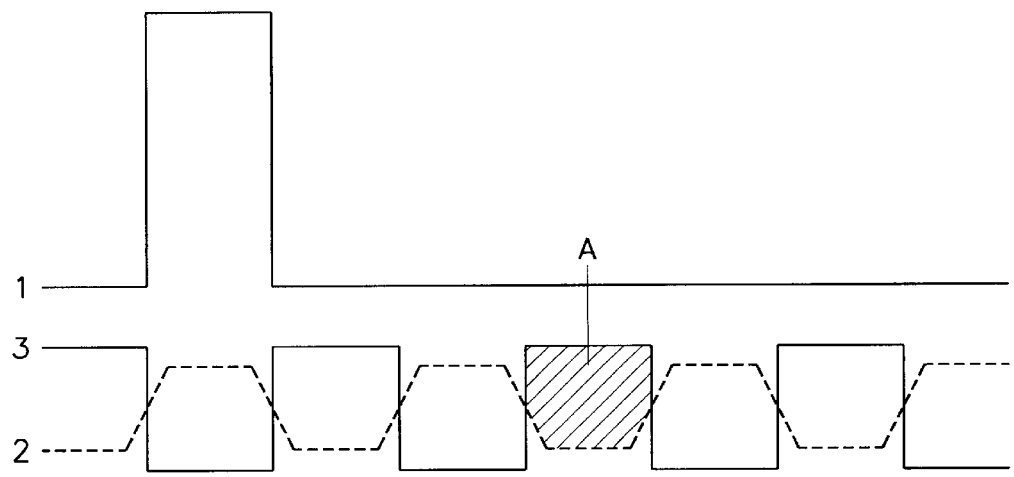
FIGS. 3–5 illustrate voltage waveforms for an LCD according to the prior art.
Figure 4:
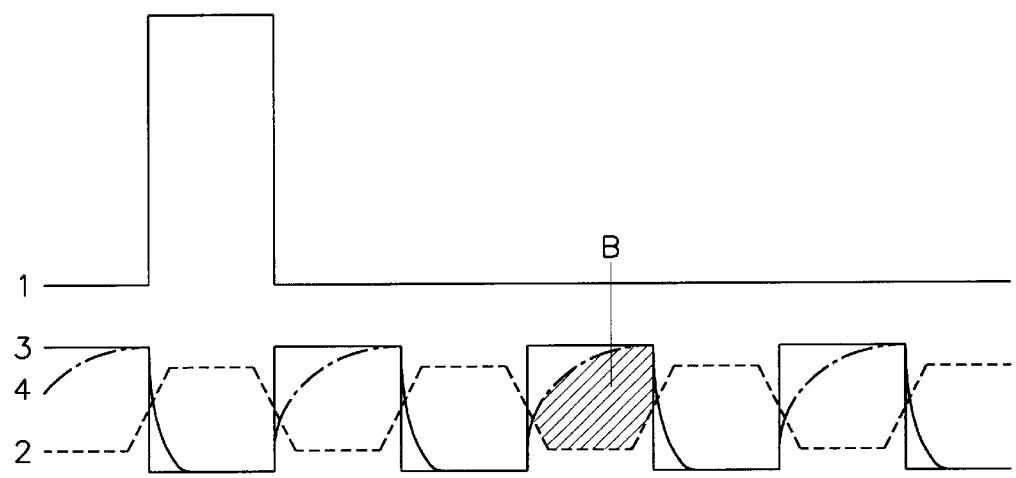
Figure 5:
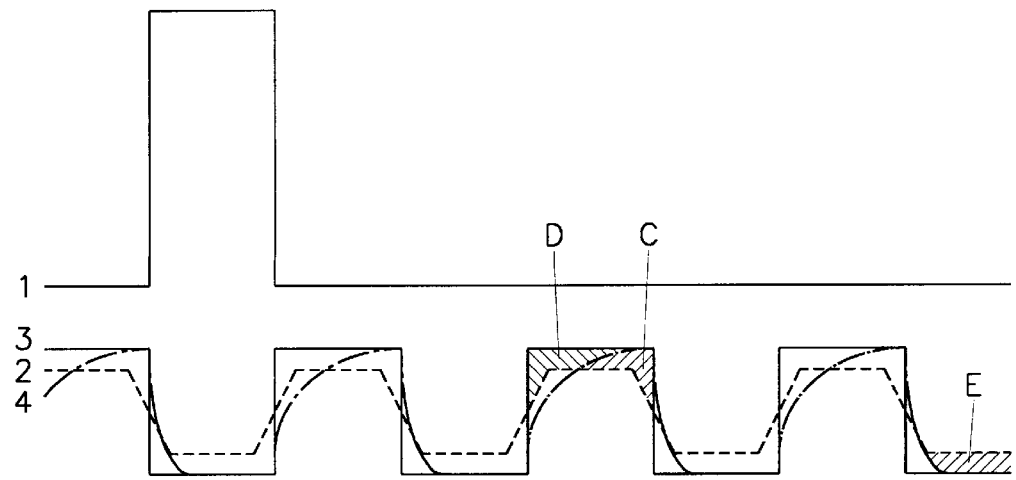

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout. Those skilled in the art will appreciate that although the description herein is made with reference to a liquid crystal display (LCD) employing "normally white" elements, the present application is also applicable to displays employing other types of elements.

Figure 6:
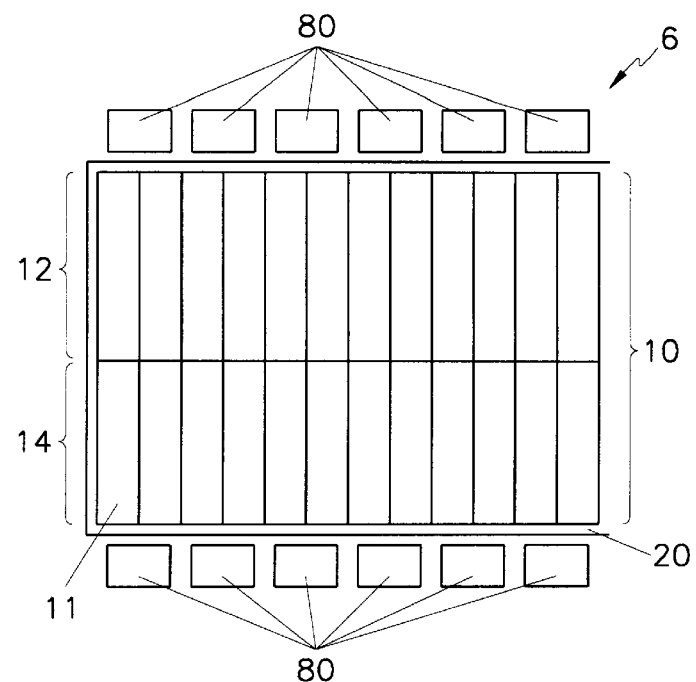
FIG. 6 is a top view illustrating a preferred embodiment of an LCD according to the present invention.

Referring to FIG. 6, a preferred embodiment of a liquid crystal display 6 according to the present invention include first and second opposed substrates 20, 10. The second substrate 10 has a plurality of common electrode regions 11 formed thereon, preferably arranged as first and second rows 12, 14. Respective first and second pluralities of data line driving packages 80 are positioned adjacent respective first and second edges of the second substrate 10.

Figure 7:
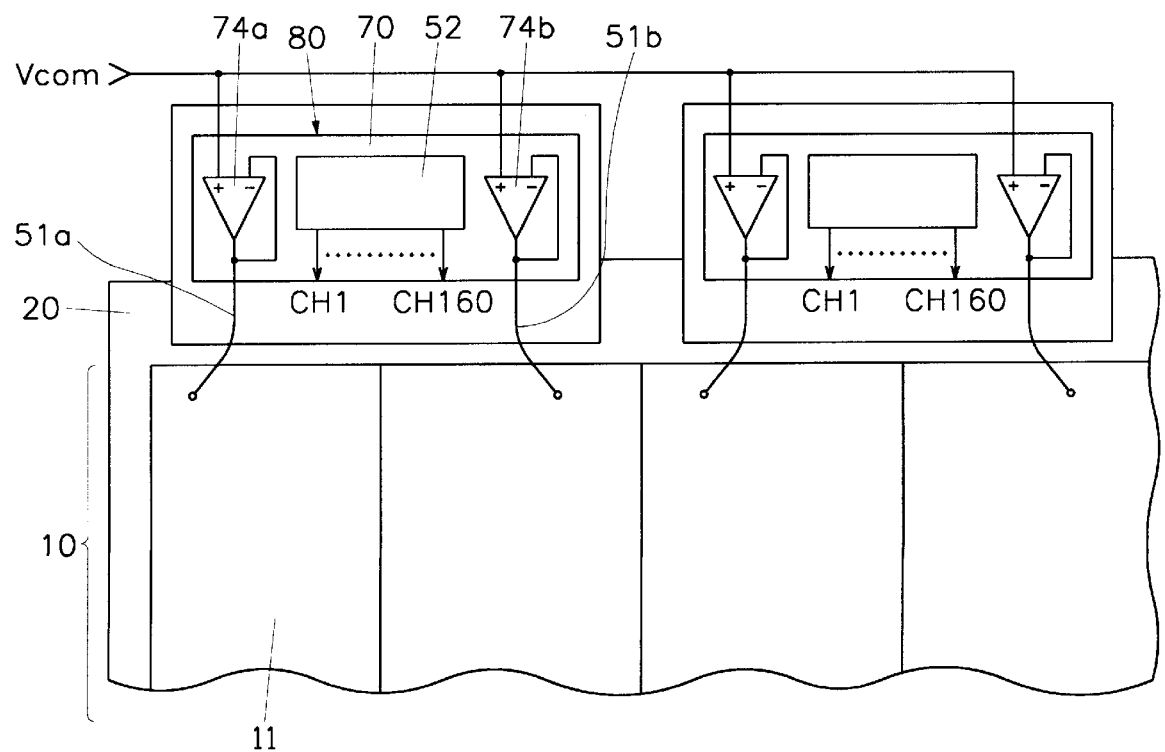
FIG. 7 is a detailed view of the embodiment of FIG. 6.

FIG. 7 illustrates in detail a data line driving package 80 according to a preferred embodiment of the present invention. A bonding substrate 70, e.g., a tape automated bonding (TAB) tape, is attached to the first substrate 20 adjacent an edge of the second substrate 10. The bonding substrate 70 has a plurality of data line conductors CH1–Ch160 which are electrically connected to a plurality of data lines which are formed on the first substrate 20. The data lines on the first substrate 20 may have various configurations well known to those skilled in the art, and need not be discussed in detail herein. The bonding substrate 70 also includes first and second common electrode conductors 51a, 51b which are electrically connected to first and second adjacent common electrode regions 11a, 11b. As illustrated, a data line driver 52, e.g., a special purpose integrated circuit (IC), is mounted on the bonding substrate 70, and is electrically connected to the plurality of data line conductors CH1–Ch160. The data line driver IC may include buffers, amplifiers, filters, and the like, as will be understood by those skilled in the art.

Each bonding substrate 70 also has first and second common electrode drivers 74a, 74b mounted thereon. A respective one of the first and second common electrode drivers 74a, 74b is electrically connected to a respective one of the first and second common electrode conductors 51a, 51b. As illustrated, each of the common electrode drivers includes a voltage follower circuit which receives a common electrode signal Vcom, producing a common electrode potential on each of the common electrode regions 11a, 11b. As a respective one of the common electrode regions 11a, 11b is separately driven by a respective one of the common electrode drivers 74a, 74b, a more uniform common electrode potential can be produced on the common electrode regions 11.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A liquid crystal display (LCD), comprising:
 a first substrate;
 a plurality of common electrode regions on said first substrate;
 a second substrate attached to said first substrate in an opposed relationship thereto; and
 a plurality of bonding substrates attached to said second substrate adjacent an edge of said first substrate, a respective one of said bonding substrates including a common electrode conductor electrically connected to a common electrode region of said plurality of common electrode regions,
 wherein a respective one of said bonding substrates has a common electrode driver mounted thereon, electrically connected to the common electrode conductor thereof.

2. An LCD according to claim 1, wherein a respective one of said common electrode drivers comprises a voltage follower circuit.

3. An LCD according to claim 1, wherein a respective one of said bonding substrates includes a first common electrode conductor and a second common electrode conductor electrically connected to adjacent first and second common electrode regions, respectively, and wherein a respective one of said bonding substrates has a first common electrode driver and a second common electrode driver mounted thereon, said first and second common electrode drivers being electrically connected to the first and second common electrode conductors, respectively.

4. An LCD according to claim 1, further comprising a plurality of data lines formed on said second substrate, and wherein a respective one of said bonding substrates further comprises a group of data line conductors electrically connected to a group of data lines of said plurality of data lines, and further comprising a plurality of data line drivers, a respective one of said plurality of data line drivers being mounted on a respective one of said plurality of bonding substrates and electrically connected to said group of data line conductors thereof.

5. An LCD according to claim 1:
wherein said plurality of common electrode regions comprises a first row of common electrode regions and a second row of common electrode regions;
wherein said plurality of bonding substrates comprises:
a first plurality of bonding substrates mounted adjacent said first row of common electrode regions; and
a second plurality of bonding substrates mounted adjacent said second row of common electrode regions.

6. An LCD according to claim 5, wherein a respective one of said bonding substrates includes a first common electrode conductor and a second common electrode conductor electrically connected to first and second adjacent common electrode regions, respectively, and wherein a respective one of said bonding substrates has a first common electrode driver and a second common electrode driver mounted thereon, said first and second common electrode drivers being electrically connected to said first and second common electrode conductors, respectively.

7. A liquid crystal display (LCD), comprising:
a first substrate and a second substrate attached in an opposed relationship;
a liquid crystal material disposed between said first and second substrates;
a plurality of common electrode regions on said first substrate;
a plurality of data lines on said second substrate;
a plurality of bonding substrates attached to said second substrate adjacent an edge of said first substrate, a respective one of said bonding substrates including a group of data line conductors electrically connected to a group of data lines of said plurality of data lines and a common electrode conductor electrically connected to a common electrode region of said plurality of common electrode regions;
a plurality of data line drivers, a respective one of said plurality of data line drivers being mounted on a respective one of said plurality of bonding substrates and electrically connected to said group of data line conductors thereof; and
means, electrically connected to said common electrode conductors of said bonding substrates, for separately driving each of said plurality of common electrode regions to thereby produce a common electrode potential on each of said common electrode regions.

8. An LCD according to claim 7, wherein said means for separately driving comprises a plurality of common electrode drivers, a respective one of said plurality of drivers being electrically connected to a respective one of said common electrode regions, each of said plurality of common electrode drivers being responsive to a common electrode signal to produce said common electrode potential on each of the common electrode regions.

9. An LCD according to claim 8, wherein a respective one of said common electrode drivers comprises a voltage follower circuit.

10. An LCD according to claim 8, wherein a respective one of said bonding substrates has a common electrode driver mounted thereon, electrically connected to the common electrode conductor thereof.

11. An LCD according to claim 10, wherein a respective one of said bonding substrates includes a first common electrode conductor and a second common electrode conductor electrically connected to adjacent first and second common electrode regions, respectively, and wherein a respective one of said bonding substrates has a first common electrode driver and a second common electrode driver mounted thereon, said first and second common electrode drivers being electrically connected to the first and second common electrode conductors, respectively.

12. An LCD according to claim 10:
wherein said plurality of common electrode regions comprises a first row of common electrode regions and a second row of common electrode regions;
wherein said plurality of bonding substrates comprises:
a first plurality of bonding substrates attached to said second substrate adjacent said first row of common electrode regions; and
a second plurality of bonding substrates attached to said second substrate adjacent said second row of common electrode regions.

13. An LCD according to claim 7, wherein said plurality of bonding substrates comprises a tape automated bonding (TAB) tape.

* * * * *